United States Patent
Inoue et al.

(10) Patent No.: US 7,480,027 B2
(45) Date of Patent: Jan. 20, 2009

(54) METHOD OF MANUFACTURING LIQUID CRYSTAL DISPLAY

(75) Inventors: Hiroyasu Inoue, Kawasaki (JP); Minoru Otani, Kawasaki (JP); Yuji Nakahata, Cheonan-si (KR); Satoshi Murata, Kawasaki (JP); Norimichi Nakayama, Kitakyushu (JP); Hiroyuki Sugimura, Kakegawa (JP)

(73) Assignee: Sharp Kabushiki Kaisha, Osaka (JP)

( * ) Notice: Subject to any disclaimer, the term of this patent is extended or adjusted under 35 U.S.C. 154(b) by 312 days.

(21) Appl. No.: 11/085,031

(22) Filed: Mar. 18, 2005

(65) Prior Publication Data

US 2005/0253995 A1 Nov. 17, 2005

Related U.S. Application Data

(63) Continuation of application No. PCT/JP02/11976, filed on Nov. 15, 2002.

(30) Foreign Application Priority Data

Nov. 16, 2001 (JP) ............................. 2001-351594
Nov. 14, 2002 (JP) ............................. 2002-330279

(51) Int. Cl.
  *G02F 1/1339* (2006.01)
(52) U.S. Cl. ...................... 349/190; 349/187
(58) Field of Classification Search ............... 349/187, 349/190
  See application file for complete search history.

(56) References Cited

U.S. PATENT DOCUMENTS 6,819,392 B2  11/2004  Murata et al.

FOREIGN PATENT DOCUMENTS

| JP | 2000-111918 | 4/2000 |
|----|-------------|--------|
| JP | 2000-111925 | 4/2000 |
| JP | 2000-241803 | 9/2000 |
| JP | 2001-281672 | 10/2001 |
| JP | 2001-281678 | 10/2001 |

*Primary Examiner*—David Nelms
*Assistant Examiner*—Lucy P Chien
(74) *Attorney, Agent, or Firm*—Greer, Burns & Crain, Ltd.

(57) ABSTRACT

A method of manufacturing a liquid crystal display device by sealing liquid crystals between the substrates relying upon a drop-injection method making it easy to determine a suitable dropping amount of the liquid crystals. The method comprises forming pillar spacers for maintaining a cell thickness on a CF substrate, measuring the height of the pillar spacers, determining the dropping amount of the liquid crystals based on the number of times of executing a step of forming an alignment film again effected for the CF substrate after measuring the height of the pillar spacers, dropping the liquid crystals in the determined dropping amount onto the CF substrate or onto a TFT substrate, sticking the CF substrate and the TFT substrates together in vacuum, and returning the pressure back to the atmospheric pressure to inject the liquid crystals into between the two substrates.

11 Claims, 11 Drawing Sheets

METHOD OF MANUFACTURING LIQUID CRYSTAL DISPLAY

This is continuation of PCT International Application No. PCT/JP02/11976, filed Nov. 15, 2002.

BACKGROUND OF THE INVENTION

1. Field of the Invention

This invention relates to a method of manufacturing a liquid crystal display device and, more particularly, to a method of manufacturing a liquid crystal display device by sealing liquid crystal between the substrates relying upon a drop-injection method.

2. Description of the Related Art

A liquid crystal display device has a liquid crystal display panel constituted by two pieces of substrates and liquid crystal sealed between the two substrates. The liquid crystal display device displays a desired image by applying a voltage across the two substrates by utilizing electric and optical anisotropy of the liquid crystal molecules. It has been known that the optical characteristics of the liquid crystal display device are strongly affected by the refractive index anisotropy Δn of liquid crystal and by the cell thickness (distance between the two pieces of substrates) d.

Figure 11A:
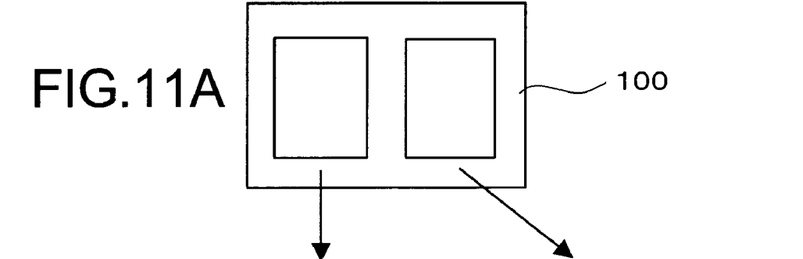
FIGS. 11A, 11B, 11C and 11D are views illustrating the steps of injecting the liquid crystal into a conventional liquid crystal display device.
Figure 11B:
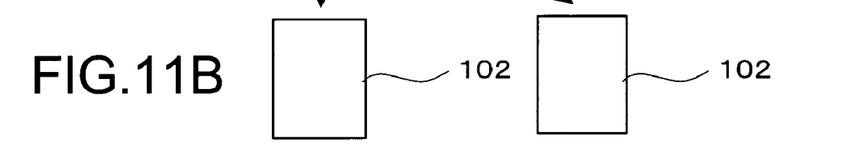
Figure 11C:
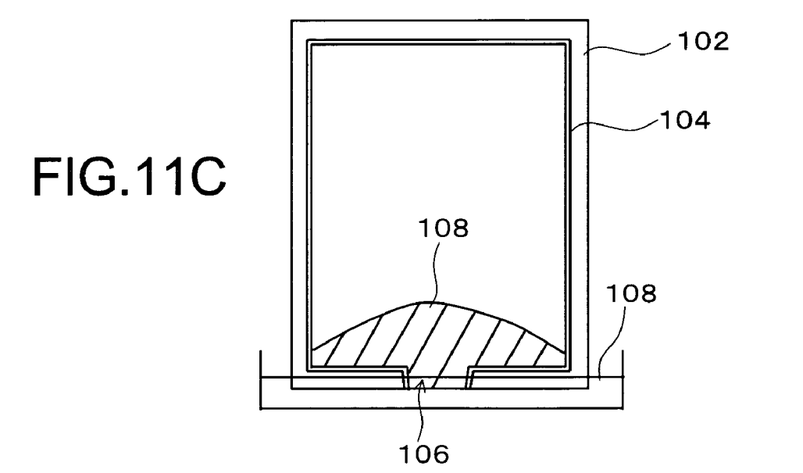
Figure 11D:
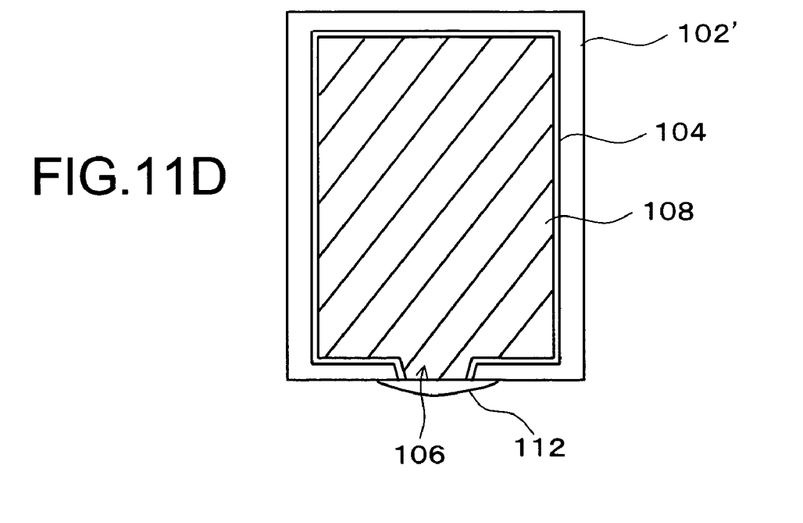

A liquid crystal display device of the type of active matrix having a switching element for each pixel is formed through the steps described below. FIG. 11 illustrates conventional steps of manufacturing a liquid crystal display device. First, on one glass substrate, there are formed a plurality of bus lines for deciding the pixel regions, thin-film transistors (TFTs) that work as switching elements, and the like. Thereafter, an alignment film is applied onto the whole surface to prepare a TFT substrate. Onto the other glass substrate, there are formed a light-shielding film (BM) for shielding the light at the ends of the pixel regions, color filters (CFs), and the like. Thereafter, an alignment film is applied onto the whole surface to prepare a CF substrate. Next, a sealing material (adhesive) 104 is applied (see FIG. 1D) to the periphery of either one of the substrates in a manner that a portion thereof is opened to form a liquid crystal injection port 106 (see FIG. 1D). Thereafter, the two substrates are stuck together as shown in FIG. 11A to prepare a stuck substrate 100. Referring next to FIG. 11B, the stuck substrate 100 is cut to remove extra portions, and is divided into a plurality of panels 102. Referring next to FIG. 11C, the liquid crystal injection port 106 of the panel 102 is immersed in the liquid crystal 108 filled in a liquid crystal dish 110 in vacuum, and the pressure is returned back to the atmospheric pressure, so that the liquid crystal 108 is injected due to the pressure differential. After the liquid crystal 108 has been charged, a sealing material 112 such as a photo-curable resin or the like is applied as shown in FIG. 11D to seal the liquid crystal injection port 106 thereby to prepare a liquid crystal display panel 102'.

When the above liquid crystal injection method (vacuum injection method) is employed, however, the time for injecting the liquid crystal 108 increases in proportion to the square power of the diagonal size of the panel 102. In the liquid crystal display device of the VA (vertically aligned) mode in which the liquid crystal molecules are aligned perpendicularly to the surfaces of the substrates, in particular, the liquid crystal molecules are injected perpendicularly to the surfaces of the substrates requiring a liquid crystal injection time which is about three times as long as that required by the horizontally aligned liquid crystal display device. Accompanying an increase in the size of the substrates, therefore, it has been urged to shorten the time for injecting the liquid crystal.

The drop-injection method is to solve the above problems and its process comprises the following constitution. First, a sealing material 104 is applied to the circumference (whole periphery) of one substrate. Next, liquid crystals 108 are dropped in a predetermined amount onto the substrate or onto the other substrate by using a dispenser. Thereafter, the two pieces of substrates are stuck together in vacuum, and the pressure is returned back to the atmospheric pressure to inject the liquid crystals 108. The drop-injection method makes it possible to stick the substrates, to inject the liquid crystals 108 and to seal them nearly simultaneously, i.e., makes it possible to inject the liquid crystals 108 in a very short period of time as compared to that of the vacuum injection method.

However, the drop-injection method involves some of the problems including the one which is related to forming a cell thickness that strongly affects the optical characteristics of the liquid crystal display device. This stems from a difference in the process parameter for determining the cell thickness depending upon a difference in the injection system. In injecting the liquid crystal 108 relying upon the vacuum injection method, the liquid crystal injection time, the mechanical strength of the gap-support members (pillar spacers) for maintaining the cell thickness, the height thereof and the density of arrangement thereof serve as parameters for determining the cell thickness. When the liquid crystals 108 are injected relying upon the drop-injection method, on the other hand, the volume in the cell determined by the surface shapes of the two substrates to be stuck together and the amount of dropping the liquid crystals 108 serve as parameters for determining the cell thickness. Therefore, the cell thickness is calculated from the volume in the cell and the amount of dropping the liquid crystals 108. If the height of the pillar spacers is too large relative to the cell thickness, bubbles evolve in the liquid crystal display panel. If the height of the pillar spacers is too small, on the other hand, the cell thickness becomes locally irregular in the liquid crystal display panel due to distortion at the time of sticking the substrates together.

Table 1 shows examples of the state in the liquid crystal display panel depending upon the cell thickness and the density of arrangement of the pillar spacers. Here, it is presumed that the pillar spaces are formed all having a uniform height on the substrate surface so as to obtain a cell thickness of 4 μm, and that the cell thickness varies depending upon the dropping amount of the liquid crystals 108. Further, each pixel has a size of about 100 μm×300 μm.

TABLE 1

| Cell thickness (μm) | Dropping amount fluctuation | Density of pillar spacer arrangement | | |
|---|---|---|---|---|
| | | One per 6 pixels | One per 12 pixels | One per 24 pixels |
| 3.72 | −7% | Bubbles evolved | Bubbles evolved | Bubbles evolved |
| 3.76 | −6% | Bubbles evolved | Bubbles evolved | Bubbles evolved |
| 3.80 | −5% | Bubbles evolved | Bubbles evolved | Good |
| 3.84 | −4% | Bubbles evolved | Bubbles evolved | Good |
| 3.88 | −3% | Bubbles evolved | Good | Good |
| 3.92 | −2% | Good | Good | Good |
| 3.96 | −1% | Good | Good | Good |
| 4.00 | 0 | Good | Good | Good |
| 4.04 | +1% | Good | Good | Good |
| 4.08 | +2% | Good | Good | Good |
| 4.12 | +3% | Cell thickness locally irregular | Good | Good |
| 4.16 | +4% | Cell thickness locally irregular | Cell thickness locally irregular | Good |
| 4.20 | +5% | Cell thickness locally irregular | Cell thickness locally irregular | Good |

TABLE 1-continued

| Cell thick-ness (μm) | Dropping amount fluc-tuation | Density of pillar spacer arrangement | | |
|---|---|---|---|---|
| | | One per 6 pixels | One per 12 pixels | One per 24 pixels |
| 4.24 | +6% | Cell thickness locally irregular | Cell thickness locally irregular | Cell thickness locally irregular |
| 4.28 | +7% | Cell thickness locally irregular | Cell thickness locally irregular | Cell thickness locally irregular |

In the liquid crystal display panel in which the pillar spacers are arranged in a number of one per 6 pixels as shown in Table 1, bubbles evolve in the liquid crystal display panel as the cell thickness becomes smaller than 3.92 μm, and the thickness of the liquid crystal display panel becomes locally irregular as the cell thickness becomes greater than 4.08 μm. Therefore, the cell thickness in a range of 3.92 to 4.08 μm, i.e., the dropping amount fluctuation of liquid crystal 108 in a range of ±2% becomes a production margin for the cell thickness. In the liquid crystal display panel in which the pillar spacers are arranged in a number of one per 12 pixels, bubbles evolve in the liquid crystal display panel as the cell thickness becomes smaller than 3.88 μm, and the thickness of the liquid crystal display panel becomes locally irregular as the cell thickness becomes greater than 4.12 μm. Therefore, the cell thickness in a range of 3.88 to 4.12 μm, i.e., the dropping amount fluctuation of liquid crystals 108 in a range of ±3% becomes a production margin for the cell thickness. In the liquid crystal display panel in which the pillar spacers are arranged in a number of one per 24 pixels, bubbles evolve in the liquid crystal display panel as the cell thickness becomes smaller than 3.80 μm, and the thickness of the liquid crystal display panel becomes locally irregular as the cell thickness becomes greater than 4.20 μm. Therefore, the cell thickness in a range of 3.80 to 4.20 μm, i.e., the dropping amount fluctuation of liquid crystals 108 in a range of ±5% becomes a production margin for the cell thickness.

As described above, the production margin of the cell thickness increases with a decrease in the density of arranging the pillar spacers. However, if the density of arranging the pillar spacers is too low, the thickness of the cells tend to be varied when pushed by fingers or the like. In many cases, therefore, forming the pillar spacers in a number of one per 24 pixels is a limit of density of arrangement. The production margin of the cell thickness in this case is in a range of ±5%.

This is based on the assumption that the pillar spacers on the same substrate are all formed maintaining a uniform height. In practice, however, the pillar spacers include a fluctuation of about ±0.15 μm in their height. In the liquid crystal display panel having a cell thickness of 4 μm, this corresponds to about ±3% to 4%. Therefore, the real production margin of the cell thickness becomes smaller than ±5%.

In the step of injecting the liquid crystals based on the drop-injection method, therefore, it becomes important to drop the liquid crystals 108 in a suitable amount to improve the yield of production while suppressing the evolution of bubbles and local irregularity of cell thickness. Therefore, there has been proposed a method of determining the amount of dropping the liquid crystals 108 based on the height of the pillar spacers (see, for example, JP-A-2001-281678). The dropping amount can be correctly determined if the height of the pillar spacers is measured just prior to dropping the liquid crystals 108. For this purpose, however, an additional step is necessary for measuring the height of the pillar spacers prior to dropping the liquid crystals 108 resulting in an increase in the tact (time required by an apparatus for treating a piece of substrate). In general, the pillar spacers are measured for their height in their whole number or in part of their number immediately after a layer is applied on the whole surface of the substrate to form pillar spacers or immediately after the pillar spacers are formed by the subsequent patterning to guarantee the stability of the process, e.g., so that a change in time series thereof can be comprehended. By utilizing the result of this measurement, therefore, the steps of production can be simplified rather than measuring again the height of the pillar spacers prior to dropping the liquid crystals 108, and the cost of production can be lowered.

It was, however, found that depending upon the materials forming the pillar spacers, the height of the pillar spacers after formed undergoes a change through the treatments described below.

(1) The height of the pillar spacers decreases if the substrate surfaces are subjected to the reforming treatment such as ashing for improving the printing property at the time of applying an alignment film on the substrate.

(2) The height of the pillar spacers decreases if the substrate is regenerated by the alignment film regeneration treatment by peeling off the alignment film that was irregularly applied and forming again the alignment film. This is due to that the pillar spacers formed by using an organic material such as an acrylic resin, a novolak resin or a polyimide resin are partly dissolved by an NMP (N-methylpyrrolidone) or a TMAH (tetramethylammonium hydroxide) aqueous solution used for peeling off the alignment film formed by using a polyimide resin or the like.

(3) The height of the pillar spacers decreases if the substrate is heat-treated (annealed) at a high temperature (e.g., not lower than 160° C.) because the pillar spacers formed by using an organic polymer are thermally deformed (thermally distorted).

Among them, the treatments (1) and (3) can be set to be executed the same number of times for all substrates in a lot. Therefore, a decrease in the height of the pillar spacers can be set to be nearly the same for all substrates in the lot. If the decrease in the height of the pillar spacers is nearly the same for all substrates, the amount of dropping the liquid crystals can be determined based on a difference between the height of the pillar spacers measured immediately after the formation of the pillar spacers and the amount of decrease in the height thereof. However, the alignment film regeneration treatment of (2) above may not be executed even once or may be executed repetitively a plurality of number of times depending upon the substrate. Therefore, the amount of decrease in the height of the pillar spacers differs depending upon the substrates, and it is difficult to determine a suitable dropping amount of liquid crystals based on the height of the pillar spacers measured immediately after the formation of the pillar spacers.

Figure 12:
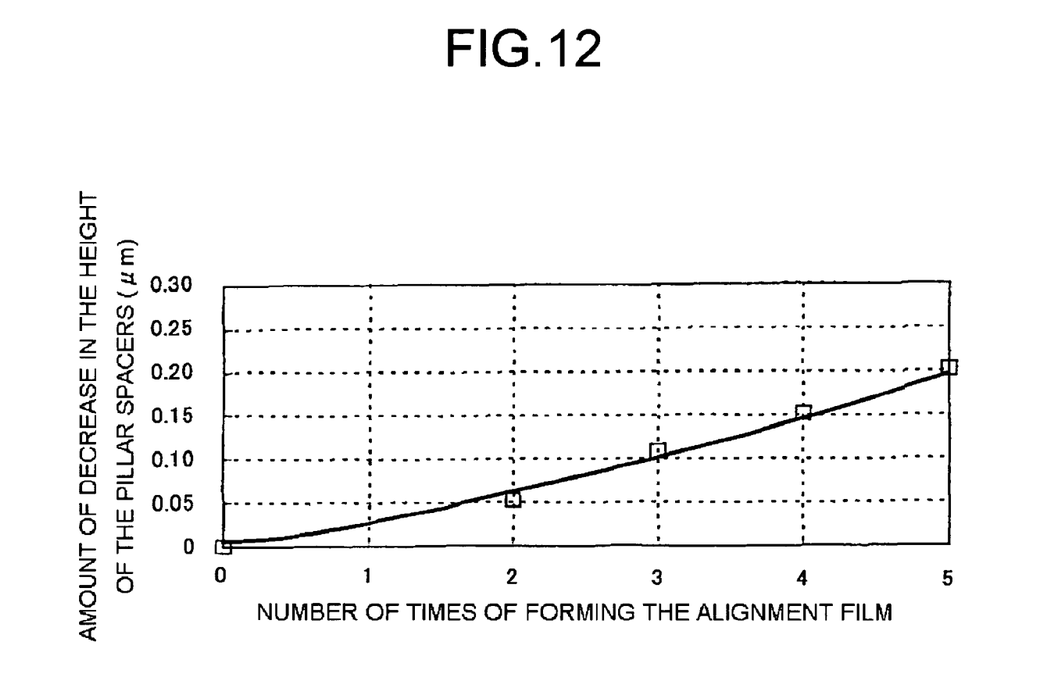
FIG. 12 is a diagram illustrating the amount of decrease in the height of the pillar spacers depending upon the number of times of forming the alignment film again.

FIG. 12 illustrates the amount of decrease in the height of the pillar spacers depending upon the number of times of regenerating the alignment film, wherein the abscissa represents the number of times of regenerating the alignment film and the ordinate represents the amount of decrease (μm) in the height of the pillar spacers. Referring to FIG. 12, the amount of decrease in the height of the pillar spacers is nearly proportional to the number of times of regenerating the alignment film. The height of the pillar spacers decreases by about 0.03 μm after every regeneration of the alignment film. This corresponds to 0.75% of the cell thickness when the liquid crystal display panel has the cell thickness of 4 μm. Therefore, if the dropping amount of the liquid crystals 108 is determined based on the height of the pillar spacers measured just after they are formed, a problem arouses in that the production margin for the cell thickness is deviated if the treatment for regenerating the alignment film is executed a plurality of number of times.

SUMMARY OF THE INVENTION

It is an object of this invention to provide a method of manufacturing a liquid crystal display device, which is capable of easily determining a suitable dropping amount of liquid crystals.

The above object is accomplished by a method of manufacturing a liquid crystal display device comprising, forming pillar spacers for maintaining a cell thickness on a first substrate, measuring the height of the pillar spacers, determining the dropping amount of the liquid crystals based on the number of times of executing a step of a predetermined treatment for the first substrate after the height of the pillar spacers has been measured, dropping the liquid crystals in the determined dropping amount onto the first substrate or onto a second substrate, and sticking the first and the second substrates together in vacuum, and returning the pressure back to the atmospheric pressure to inject the liquid crystals into between the first substrate and the second substrate.

BRIEF DESCRIPTION OF THE DRAWINGS

FIGS. 8A and 8B are sectional views illustrating a state where the height of the pillar spacer decreases due to ashing treatment, alignment film regeneration treatment, heat treatment or the like;

DETAILED DESCRIPTION OF THE INVENTION

Figure 1:
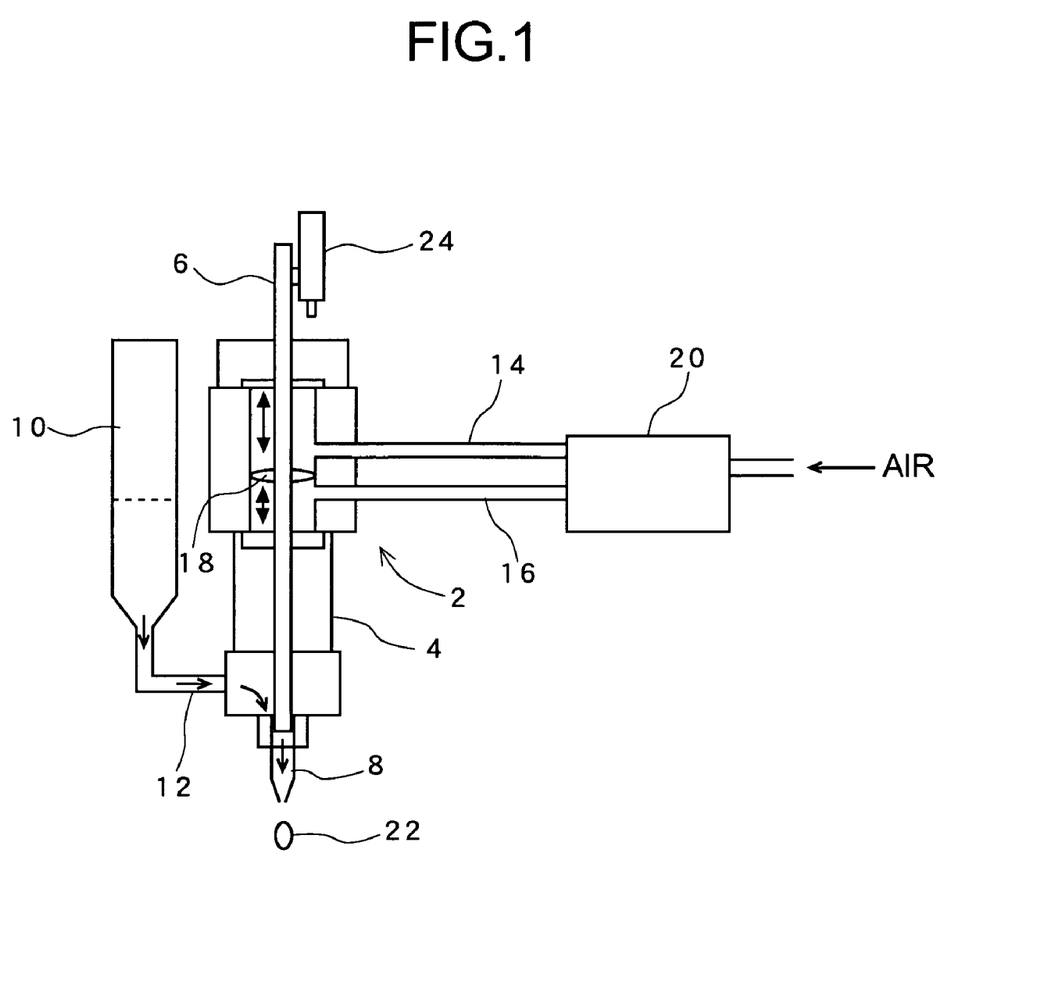
FIG. 1 is a view illustrating the constitution of a dispenser used in a method of manufacturing a liquid crystal display device according to a first embodiment of the invention.

A method of manufacturing a liquid crystal display device according to a first embodiment of the invention will be described with reference to FIGS. 1 to 10. FIG. 1 illustrates the constitution of a dispenser possessed by a liquid crystal dropping device used in the method of manufacturing the liquid crystal display device according to the embodiment. Referring to FIG. 1, the dispenser 2 has a housing 4 of a hollow cylindrical shape, and the center axis of the cylindrical shape is directed nearly vertically. In the housing 4, a slender rod-like piston 6 is supported so as to move in the vertical direction along the center axis of the cylindrical shape. The lower end of the piston 6 is allowed to move in a nozzle 8 provided at the lower end of the housing 4 in the vertical direction. Through an opening formed in the side wall near the nozzle 8 of the housing 4, liquid crystals in a liquid crystal container 10 flows into the nozzle 8 via a feed pipe 12 as indicated by arrows that are shown. The liquid crystals arrived at the nozzle 8 drop from the nozzle 8 depending upon the moving amount of the end of the piston 6 at the nozzle 8. Unless an external force is received, the liquid crystals are not spewed out from the nozzle 8 owing to the surface tension.

Two air flow-in ports 14 and 16 are formed in the side wall of an air chamber in the housing 4 being separated away in the vertical direction. A partitioning wall 18 is fixed to the piston 6 to separate the interior of the air chamber into two. The partitioning wall 18 slides together with the piston 6 on the inner wall of the air chamber between the air flow-in ports 14 and 16. When the air flows into the air chamber from the air flow-in port 14, therefore, the partitioning wall 18 receives the pressure downward in the vertical direction and moves down. When the air flows into the air chamber from the air flow-in port 16, the partitioning wall 18 receives the pressure upward in the vertical direction and moves up. This makes it possible to move the piston 6 in the vertical direction by a predetermined amount.

The air flow-in ports 14 and 16 are connected to a pump controller 20. The pump controller 20 takes in the air and feeds the air to either one of the air flow-in port 14 or 16 at a predetermined timing.

The dispenser 2 constituted as described above so works that the liquid crystals 22 are dropped in a predetermined amount per a shot. The amount of dropping the liquid crystal per a shot can be adjusted by using a micro-gauge 24 fixed to the piston 6 protruding upward beyond the housing 4 and by controlling the amount of motion of the piston 6 in the vertical direction.

Figure 2:
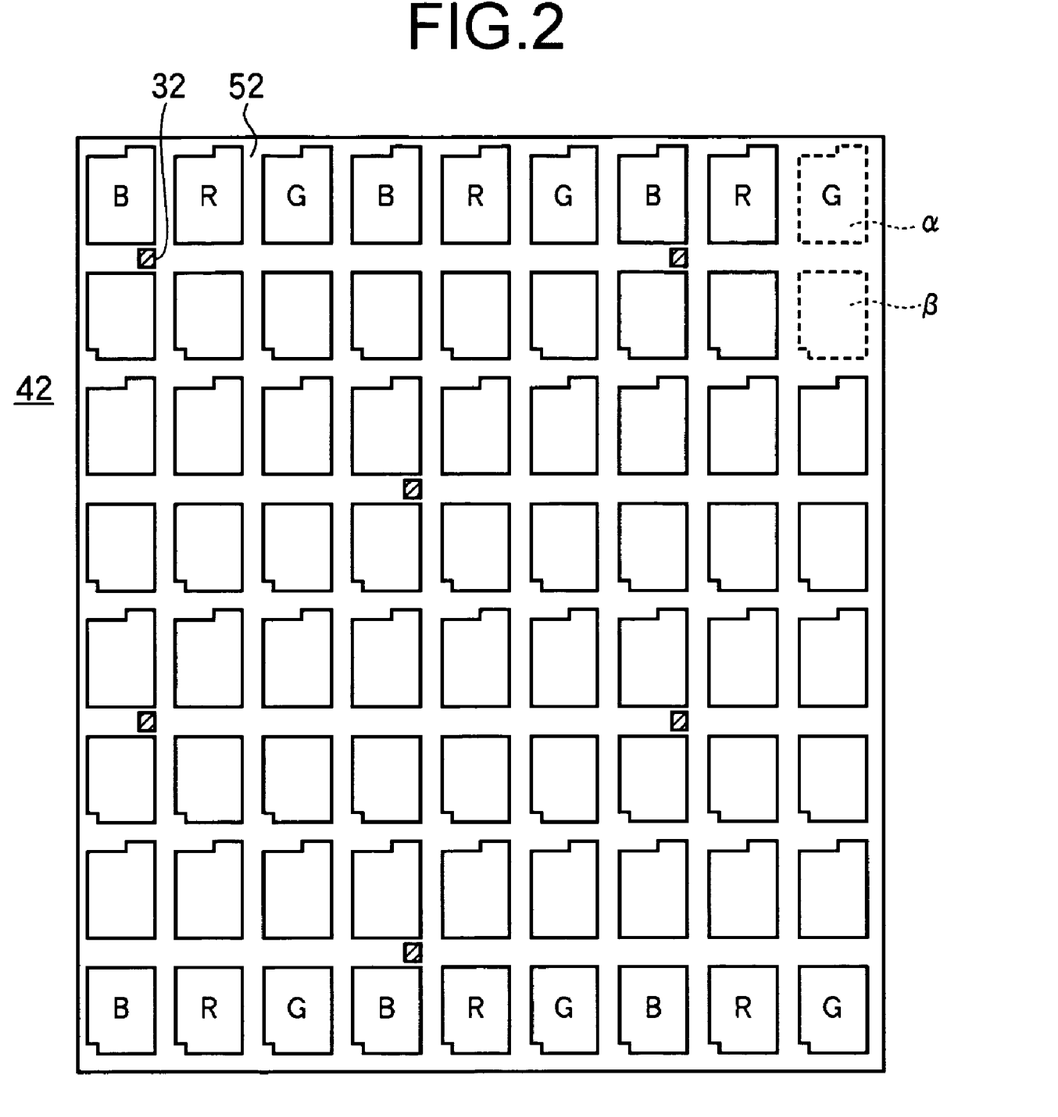
FIG. 2 is a view illustrating the constitution of the liquid crystal display device manufactured by the manufacturing method according to the first embodiment of the invention.
Figure 3:
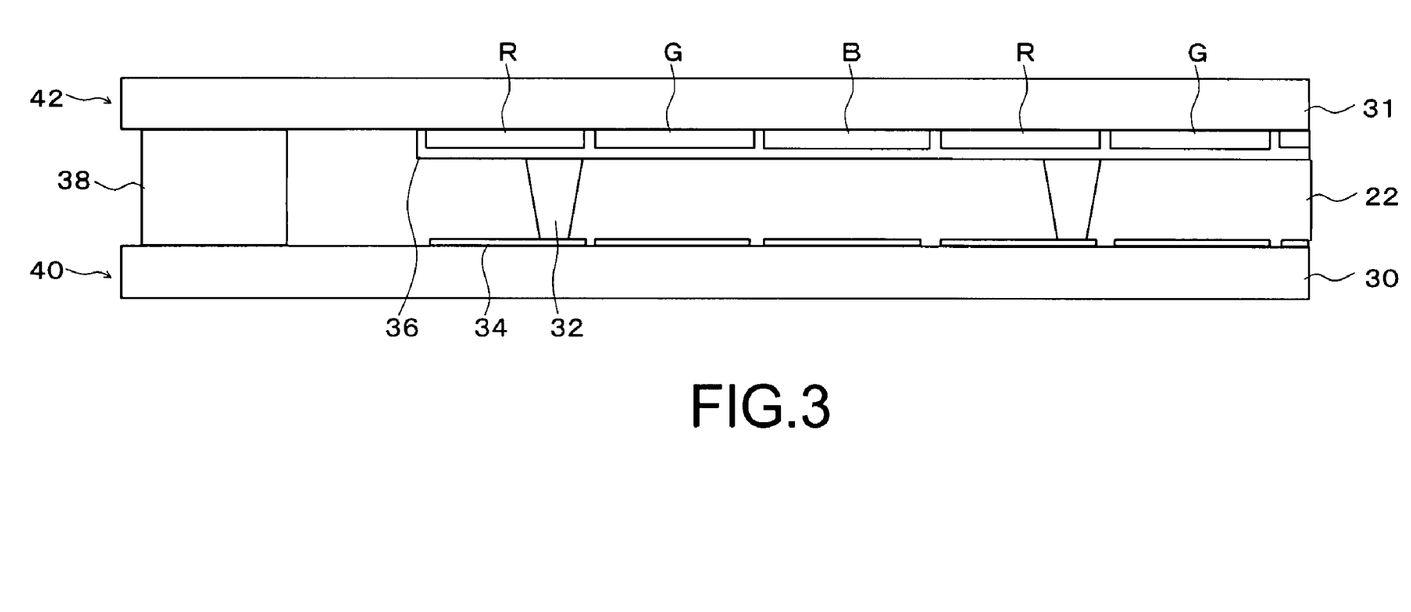
FIG. 3 is a sectional view illustrating the constitution of the liquid crystal display device manufactured by the manufacturing method according to the first embodiment of the invention.

Next, the constitution of the liquid crystal display device manufactured by the manufacturing method according to the embodiment will be described with reference to FIGS. 2 to 4. FIG. 2 illustrates the constitution of a CF substrate in the liquid crystal display device. FIG. 3 illustrates in cross section the constitution of the liquid crystal display device cut near the outer peripheral portion on where a sealing material is applied. Referring to FIGS. 2 and 3, a BM 52 is formed like a lattice on a glass substrate 31 of a CF substrate 42. Though not illustrated, TFTs, a gate bus line and a drain bus line are formed on region shielded by the BM 52 on the side of the TFT substrate 40. The pixel regions on the side of the CF substrate 42 are decided by the BM 52. The BM 52 is further shielding the region where a storage capacitor bus line (not shown) is formed on the TFT substrate 40 traversing and extending the pixel region. Therefore, each pixel is constituted by two openings α and β represented by broken lines in FIG. 2.

A CF layer of any one color out of red (R), green (G) and blue (B) is formed on each pixel region of the CF substrate 42. The colors R, G and B of the CF layers are formed like stripes extending, for example, up and down in FIG. 2. On the whole surfaces on the CF layers R, G and B excluding the outer periphery of the CF substrate 42, there is formed a common electrode 36 comprising a transparent conductive film such as ITO. An alignment film (not shown) is formed on the whole surface of the substrate on the common electrode 36.

The TFT substrate 40 has pixel electrodes 34 formed for each of the pixel regions on the glass substrate 30. The alignment film (not shown) is formed on the whole surface of the substrate on the pixel electrodes 34.

Liquid crystal 22 is sealed between the CF substrate 42 and the TFT substrate 40. The cell thickness is maintained by pillar spacers 32 formed on the region of the CF substrate 42 shielded by the BM 52. In FIG. 2, the pillar spacers 32 are formed on the region on the BM 52 that shields the storage capacitor bus line and on where the CF layer B is formed, in a number of, for example, one per 6 pixels.

Figure 4A:
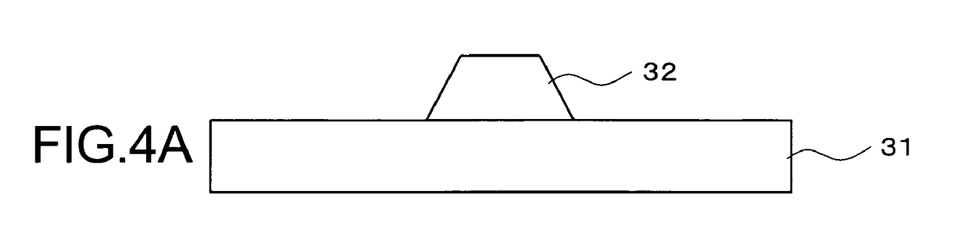
FIGS. 4A, 4B and 4C are sectional views illustrating the constitution of a pillar spacer in the liquid crystal display device manufactured by the manufacturing method according to the first embodiment of the invention.
Figure 4B:
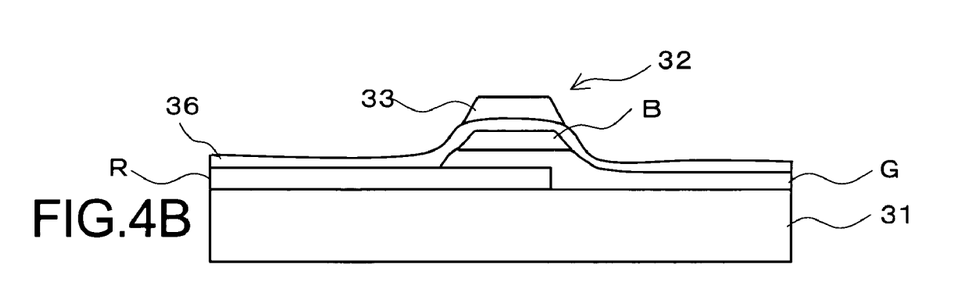
Figure 4C:
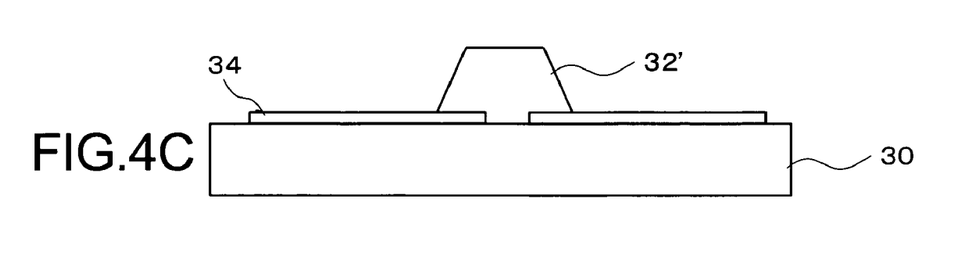

FIG. 4A illustrates the constitution of a pillar spacer on the CF substrate. Referring to FIG. 4A, the pillar spacer 32 is formed by using, for example, a novolak resin only maintaining a predetermined height. In addition to the pillar spacers having the constitution shown in FIG. 4A, there can be further exemplified pillar spacers 32 having a constitution formed by laminating a plurality of layers or having a constitution provided with functions other than the function of maintaining the cell thickness. FIG. 2 illustrates an example of forming pillar spacers 32 in the pixel region on the BM 52 that shields the storage capacitor bus line. The pillar spacers 32 may be formed on the regions among a plurality of neighboring pixel regions. FIGS. 4B and 4C illustrate modified examples of the constitution of the pillar spacers. Referring to FIG. 4B, the pillar spacer 32 is formed by a laminate of three CF resin layers R, G and B, a common electrode 36 formed on the CF resin layers, and a resist layer 33 formed on the common electrode 36. Referring to FIG. 4C, the pillar spacer 32' is formed by a black resin. The pillar spacer 32' works, for example, as a resin BM for shielding the region between the neighboring pixel electrodes 34 on the side of the TFT substrate 40 and for shielding the region on the TFT.

Figure 5:
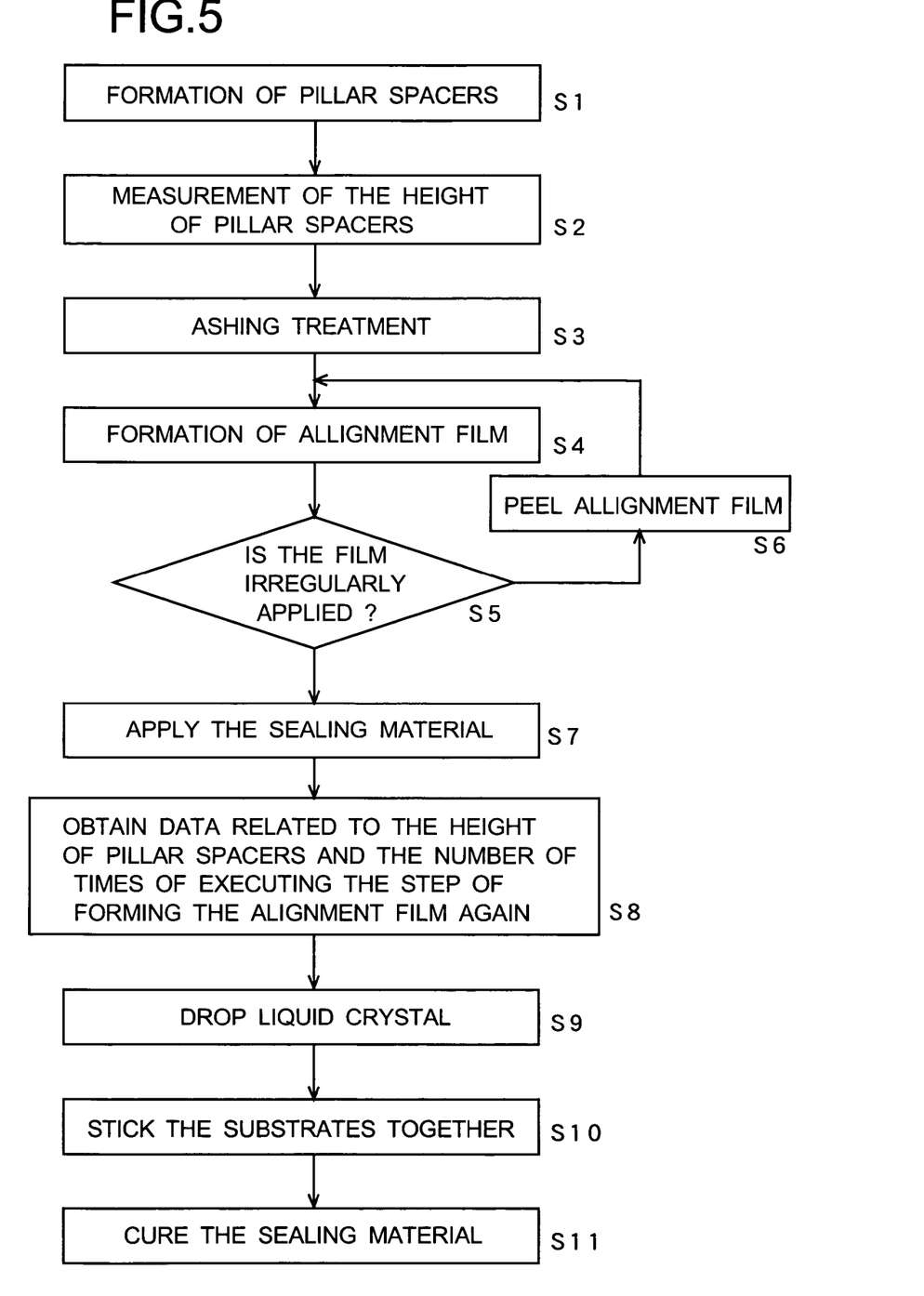
FIG. 5 is a flowchart illustrating the steps of manufacturing the liquid crystal display device according to the first embodiment of the invention.
Figure 6A:
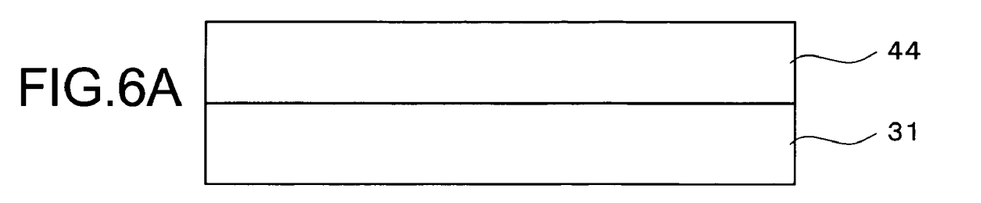
FIGS. 6A, 6B, 6C and 6D are sectional views illustrating the steps of manufacturing the liquid crystal display device according to the first embodiment of the invention.
Figure 6B:
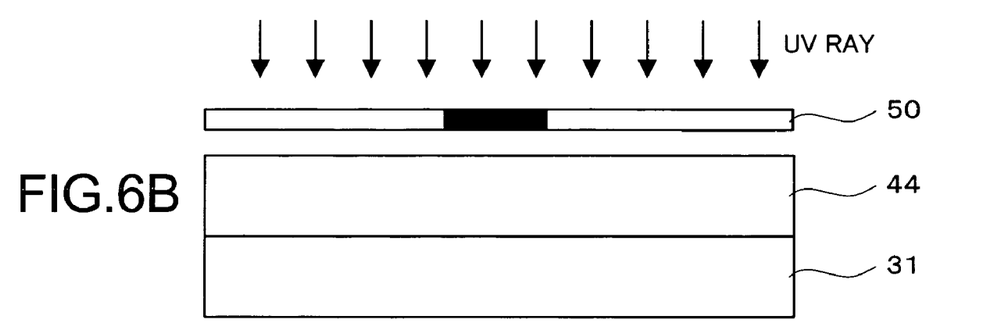
Figure 6C:
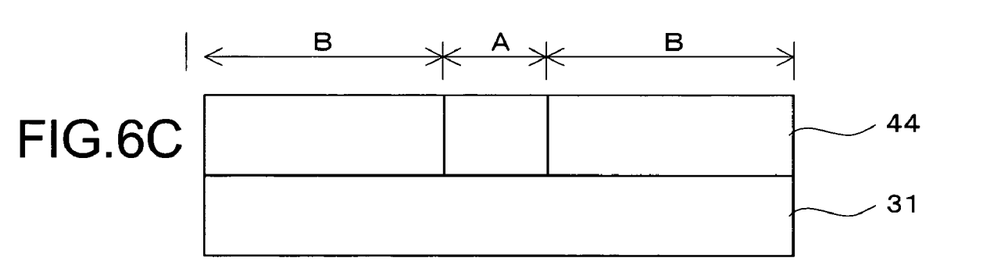
Figure 6D:
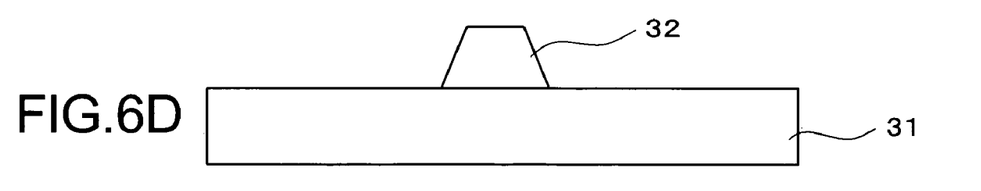

Next, the method of manufacturing the liquid crystal display device according to the embodiment will be described with reference to FIGS. 5 to 9. FIG. 5 is a flowchart illustrating the steps of manufacturing the liquid crystal display device according to the embodiment. First, referring to FIG. 5, the pillar spacers 32 are formed on, for example, the CF substrate 42 (step S1). FIG. 6 is a sectional view illustrating the steps of forming the pillar spacers at step S1. Referring to FIG. 6A, a photosensitive resin layer 44 is formed by applying, for example, a positive-type photosensitive resin onto the whole surface of the glass substrate 31 on the side of the CF substrate 42 on which BM and CFs are formed. Next, referring to FIG. 6B, the photosensitive resin layer is irradiated with a UV ray via a photomask 50. As shown in FIG. 6C, therefore, unexposed portions A and exposed portions B are formed in the photosensitive resin layer 44. Next, exposed portions B are removed from the photosensitive resin layer 44 by developing followed by drying and annealing to cure the unexposed portion A of the photosensitive resin layer 44 thereby to form the pillar spacers 32 shown in FIG. 6D. The pillar spacers 32 are formed at a density of, for example, one per 6 pixels. The pillar spacers 32 may be formed by using a negative-type photosensitive material. The pillar spacers 32 may be formed by applying a photosensitive material onto a non-photosensitive material, followed by exposure to light and developing to form an etching mask, by patterning the non-photosensitive material by using the etching mask that is formed, and by peeling the etching mask off.

Figure 7A:
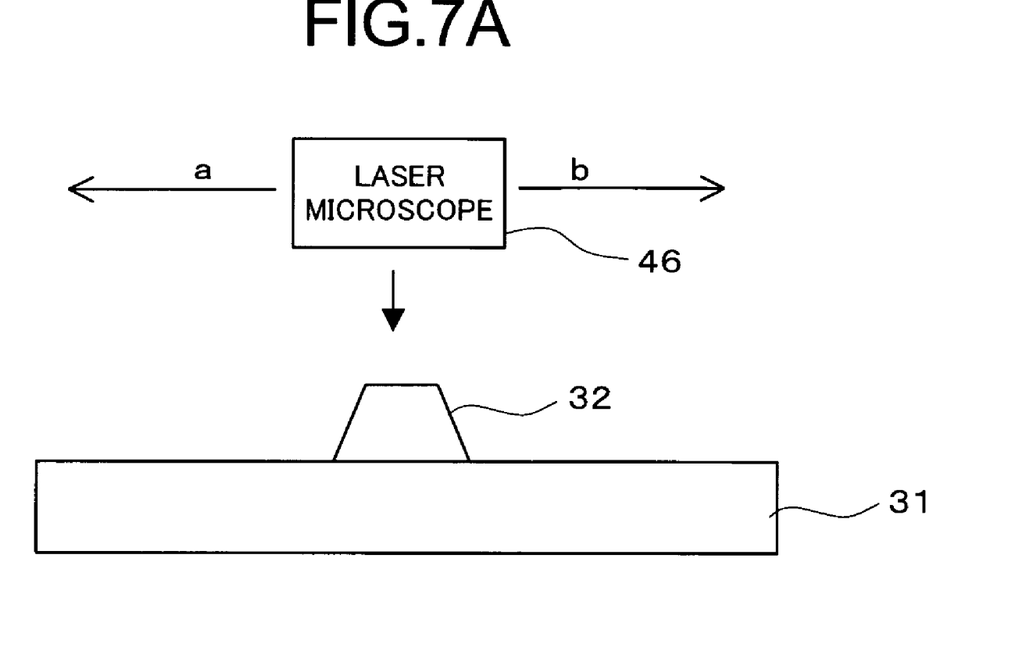
FIGS. 7A and 7B are sectional views illustrating the steps of manufacturing the liquid crystal display device according to the first embodiment of the invention.

Next, the height of the formed pillar spacers 32 is measured (step S2). FIG. 7 illustrates a step of measuring the height of the pillar spacers at step S2. Referring to FIG. 7A, a laser microscope 46 is used to detect mechanical coordinates of a portion where a focal point is obtained on a region close to the pillar spacer 32. Thereafter, a profile of the shape of the substrate surface is obtained by the scanning in the directions of arrows a and b in the drawing in parallel with the substrate surface to measure the height of the pillar spacer 32. There can be further exemplified a method of measuring the height of the pillar spacers 32 by using an interatomic force microscope (AFM) and a method of finding the height of the pillar spacers 32 by forming dummy pillar spacers for measurement outside the display regions through the same steps as those for forming the pillar spacers 32, and by measuring the height of the dummy pillar spacers by using a height detecting device of the contact type. If the center of variation of the height shifts stably, the pillar spacers 32 may be measured for their height by, for example, picking up only a predetermined number of pieces thereof out of the substrates of a lot.

Figure 7B:
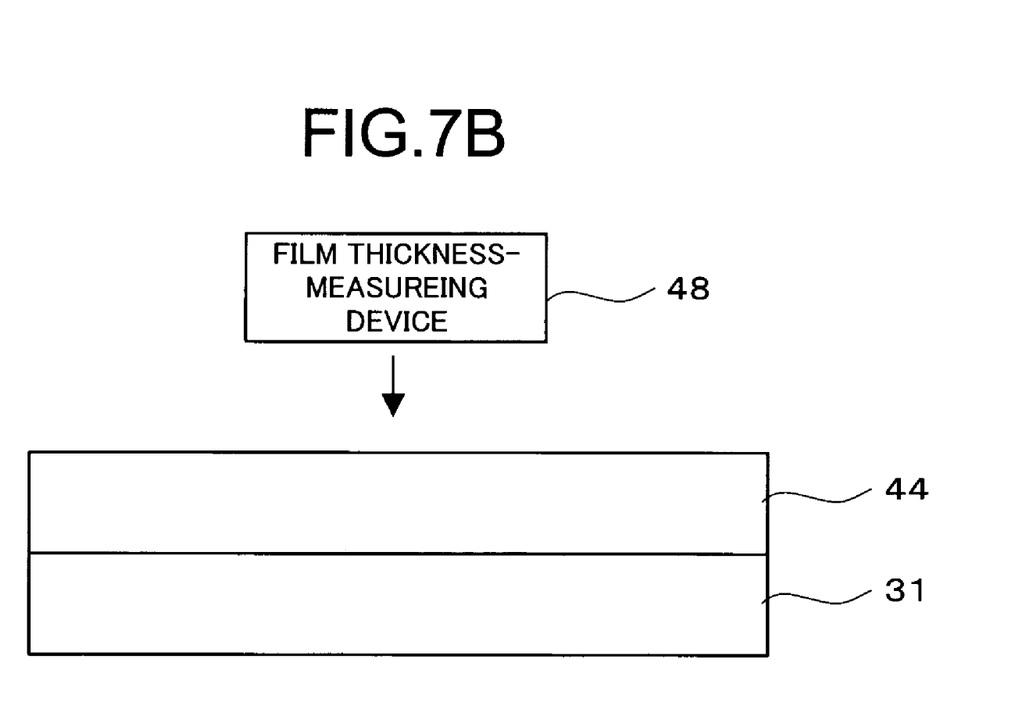

As an easier method, referring to FIG. 7B, the thickness of the photosensitive resin layer 44 is measured by using an interference type film thickness measuring device 48 prior to forming the pillar spacers 32 by patterning the photosensitive resin layer 44, and the film thickness is used as the height of the pillar spacers 32. The interference type film thickness measuring device 48 calculates the thickness of the photosensitive resin layer 44 by irradiating the photosensitive resin layer 44 with light while varying the irradiation wavelength, and by scanning and analyzing the intensity of the reflected light that is received. This method maintains a width large enough as a measuring region and makes it possible to obtain a highly precise value as far as the inspection precision is concerned. With this method, however, it is difficult to measure the height of the pillar spacers 32 shown in FIG. 4B.

Next, to improve the printing property of the alignment film formed at the next step, the surfaces of the substrates are subjected to the ashing treatment with ultraviolet rays (UV) or ozone (step S3). A polyimide resin is applied onto the whole surface of the CF substrate 42 and is baked to form an alignment film (step S4). Next, the alignment film that is formed is checked for its irregularity (step S5). If irregularly formed as a result of checking, the alignment film is peeled off at step S6 by using an NMP or TMAH aqueous solution or by an ashing treatment, and the alignment film is formed again at step S4. The number of times the step of forming the alignment film again is effected is counted every time when the alignment film is peeled off. If the alignment film has been formed without irregularity as a result of checking, the process proceeds to step S7 where a sealing material 38 is applied to the outer periphery (whole circumference) of the region on the side of the CF substrate 42 that will be divided into panels at a subsequent step. Up to this point, the step of heat treatment has been effected a predetermined number of times for heating the CF substrate 42, such as firing the alignment film.

Figure 8A:
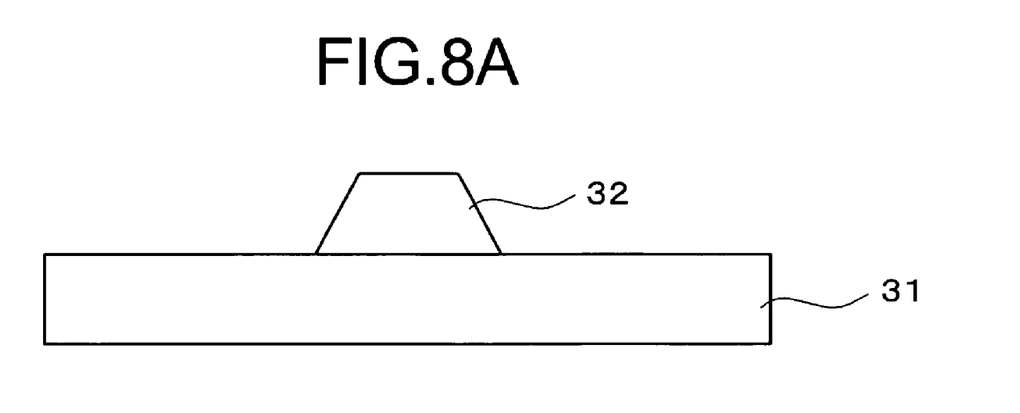
Figure 8B:
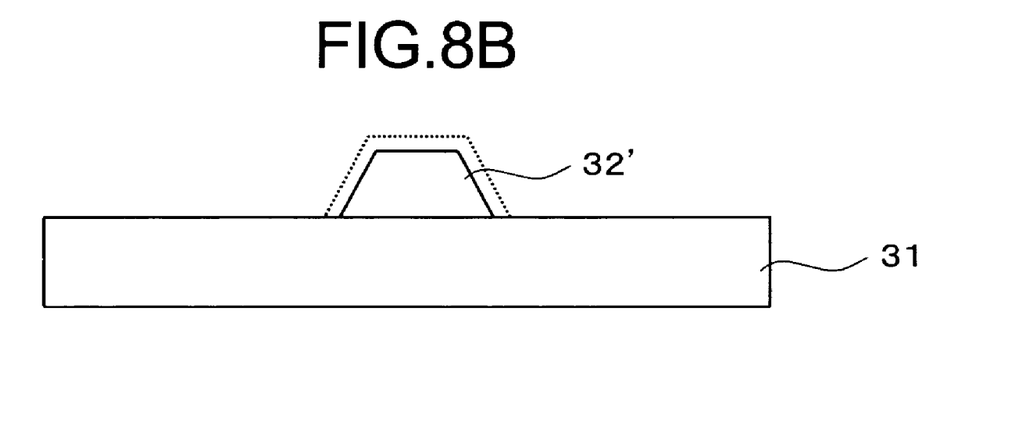

FIG. 8 is a sectional view illustrating a state where the height of the pillar spacers decreases due to the ashing treatment, treatment for forming the alignment film again or heat treatment. The pillar spacer 32 shown in FIG. 8A undergoes the deformation, loss of film and thermal distortion due to the ashing treatment, treatment for forming the alignment film again or heat treatment after the pillar spacer 32 has been formed. Therefore, the height decreases as represented by the pillar spacer 32' in FIG. 8B (the broken line in FIG. 8B represents the shape of the initial pillar spacer 32).

The amount of the liquid crystals 22 in the liquid crystal display panel is greatly affected by the cell thickness. For instance, if the height of the pillar spacer 32' which possessed a height of 4 µm when it was formed decreases by 1% down to 3.96 µm, the optimum amount of dropping the liquid crystals decreases by (an area in the panel filled with liquid crystals×0.04 µm).

Figure 9:
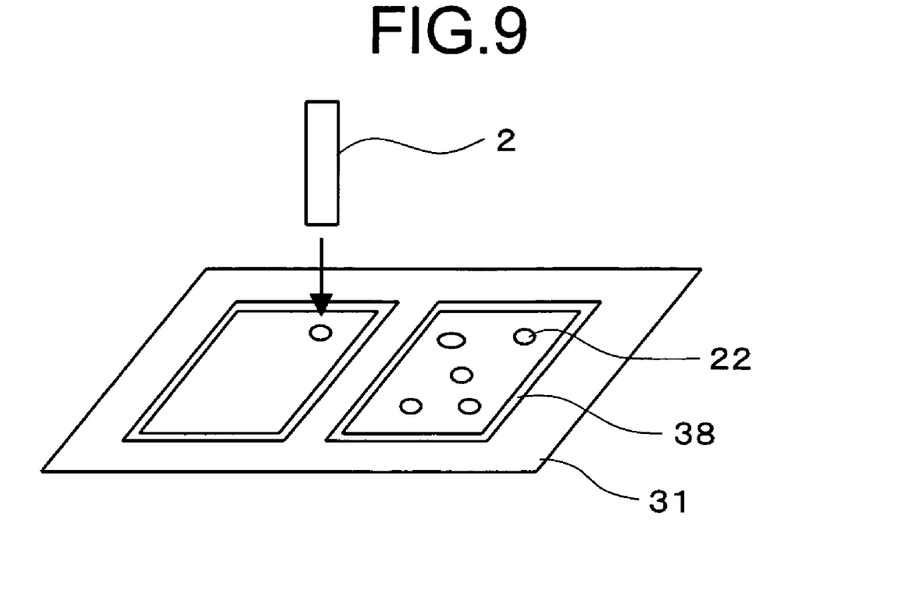
FIG. 9 is a view illustrating the steps of manufacturing the liquid crystal display device according to the first embodiment of the invention.

Next, the liquid crystal dropping device obtains the data related to the height of the pillar spacers and the number of times of executing the step of forming the alignment film again as substrate hand-over data from the device used in the preceding step (step S8). By using the liquid crystal dropping device, next, the liquid crystals of a predetermined dropping amount described below are dropped onto the CF substrate (step S9). FIG. 9 illustrates a step of dropping the liquid crystals at step S9. Referring to FIG. 9, the sealing material 38 has been applied onto the glass substrate 31 on the side of, for example, the CF substrate 42 along the circumference of the region that will be divided into panels at a subsequent step. By using the dispenser 2 of the liquid crystal dropping device, the liquid crystals 22 are dropped by a predetermined liquid crystal dropping amount onto a region of the glass substrate 31 surrounded by the sealing material 38. In FIG. 9, the liquid crystals 22 are dropped in a divided manner by using the dispenser 2. The liquid crystals, however, may be dropped at one time near the center of each panel or may be printed. The liquid crystal dropping device has a program including a calculation formula expressed by, Dropping amount of liquid crystals=((height of pillar spacers)−$A$×(number of times of executing the step of forming the alignment film again)+$B$)×$C$    (1)

where A, B and C are constants.

Here, the constant A of the second term of the right side of the formula (1) is an amount of decrease in the height of the pillar spacers 32 per each execution of the step of forming the alignment film again. The value of the constant A is, for example, 0.03 µm as described already with reference to FIG. 12. The constant B of the third term of the right side of the formula (1) is a correction coefficient.

The correction coefficient reflects a variation in the capacity in the cell caused by rugged surfaces of the substrates, a variation in the capacity in the region filled with liquid crystals outside the display portion, and a variation in the ideal cell thickness or the volume in the cell determined by dispersion in the height of the pillar spacers 32 and mechanical properties of the pillars. The value of the constant B is, for example, 0.2 µm. Here, ((height of pillar spacers)−$A$×(number of times of executing the step of forming the alignment film again)+$B$) of the right side of the formula (1) represents the thickness of the cells that are really formed. Further, the constant C that multiplies the whole right side of the formula (1) is a coefficient for finding the dropping amount of the liquid crystals from the cell thickness, and is found as a product of the area (µm$^2$) of the region onto where the liquid crystals 22 are injected on the CF substrate 42 and the density (mg/µm$^3$) of the liquid crystals 22. The value of the constant C varies depending upon the diagonal size of the liquid crystal display panel, and is 100 mg/µm if the diagonal size is about 18 to 19 inches. If summarized, Dropping amount of liquid crystals=((height of pillar spacers)−0.03×(number of times of executing the step of forming the alignment film again)+0.2)× 100    (1')

According to the formulas (1) and (1'), the dropping amount (mg) of liquid crystals can be calculated based on the height (µm) of the pillar spacers 32 and the number of times the step is executed for forming the alignment film again.

For example, when there are input the data related to that the height of the pillar spacers 32 is 3.8 µm and that the step is executed twice for forming the alignment film again, the liquid crystal dropping device determines the dropping amount of liquid crystals based on the formula (1') and drops 394 mg of liquid crystals 22 from the dispenser 2 onto the CF substrate 42. The cell thickness that is finally obtained becomes 3.94 µm.

Figure 10:
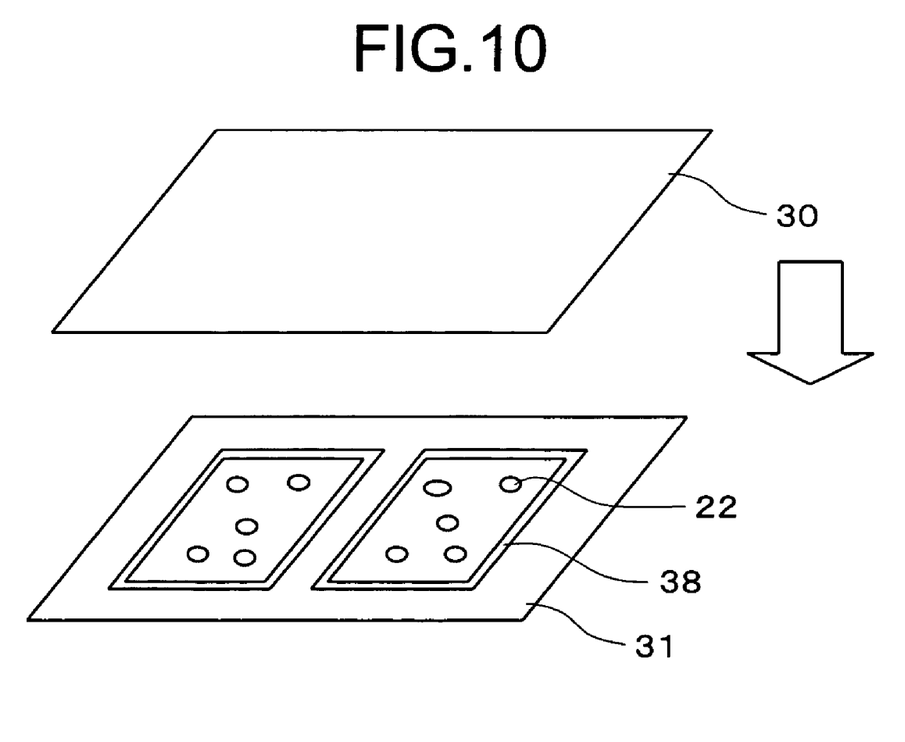
FIG. 10 is a view illustrating the steps of manufacturing the liquid crystal display device according to the first embodiment of the invention.

Next, the CF substrate 42 and the TFT substrate 40 are stuck together (step S10). FIG. 10 illustrates a step of sticking the substrates together. Referring to FIG. 10, the glass substrate 31 on the side of the CF substrate 42 on which the liquid crystals 22 are dropped in the predetermined dropping amount and the glass substrate 30 on the side of the TFT substrate 40 are stuck together in vacuum being relatively moved as indicated by, an arrow in the drawing. Next, the sealing material 38 is cured (step S11), and the substrates are divided into the panels. The liquid crystal display device is completed through the above steps.

In this embodiment, the dropping amount of the liquid crystals is determined based on the height of the pillar spacers 32 obtained from the thickness of the photosensitive resin layer 44 measured prior to forming the pillar spacers 32 by patterning, or the height of the pillar spacers 32 measured right after the pillar spacers have been formed and the number of times the step is executed for forming the alignment film again after having measured the height of the pillar spacers 32. Therefore, a suitable dropping amount of liquid crystals can be determined even without measuring again the height of the pillar spacers 32 just before dropping the liquid crystals 22 after the step of forming the alignment film again.

Next, described below is a method of manufacturing the liquid crystal display device according to a second embodiment. The liquid crystal dropping device used in the method of manufacturing the liquid crystal display device of this embodiment has a table (correspondence table) for determining the dropping amount of the liquid crystals as represented by Table 2 instead of a program possessed by the liquid crystal dropping device used in the method of manufacturing the liquid crystal display device of the first embodiment. Here, the liquid crystal display device has a diagonal size of about 18 to 19 inches.

TABLE 2

| Height of pillar spacers (µm) | Cell thickness (µm) | Dropping amount of liquid crystals (mg) |
|---|---|---|
| 3.700 | 3.900 | 390.0 |
| 3.725 | 3.925 | 392.5 |
| 3.750 | 3.950 | 395.0 |
| 3.775 | 3.975 | 397.5 |
| 3.800 | 4.000 | 400.0 |
| 3.825 | 4.025 | 402.5 |
| 3.850 | 4.050 | 405.0 |

Table 2 is formed based on the formula (1') of the first embodiment so that the height of the pillar spacers 32, the cell thickness and the dropping amount of the liquid crystals are corresponded to each other. For example, if the height of the pillar spacers 32 is 3.8 µm, 400 mg of liquid crystals 22 are dropped from the dispenser 2 on the CF substrate 42. The cell thickness that is finally obtained becomes 4.0 µm.

However, if the alignment film on the CF substrate 42 has been peeled off and formed again (step of forming the alignment film again) twice, the height of the pillar spacers 32 will have been decreased by 0.06 µm as shown in FIG. 12. Therefore, if the height of the pillar spacers 32 is 3.8 µm as measured at step S2, the height will have been decreased down to 3.74 µm after having executed the step of forming the alignment film again twice. Upon collation with Table 2, therefore, the closest height 3.75 µm is selected, and the liquid crystals 22 are dropped in a corresponding dropping amount of 395 mg on the CF substrate 42. The cell thickness that is finally obtained becomes 3.95 µm.

The liquid crystal dropping device obtains the data related to the height of the pillar spacers 32 and the number of times the steps are executed for forming the alignment film again from, for example, the upper unit through a communication network. For example, when there are input the data related to that the height of the pillar spacers 32 is 3.8 µm and that the step is executed twice for forming the alignment film again, the liquid crystal dropping device drops 394 mg of liquid crystals 22 from the dispenser 2 onto the CF substrate 42. Therefore, the cell thickness that is finally obtained becomes 3.94 µm.

The steps of manufacturing the liquid crystal display device according to the embodiment other than those described above are nearly the same as the steps of manufacturing the liquid crystal display device of the first embodiment illustrated in FIGS. 5 to 9, and are not diagramed and described here again.

This embodiment exhibits the effects same as those of the first embodiment and determines the dropping amount of liquid crystals by using the table, making it easier to determine a suitable dropping amount of the liquid crystals.

Next, described below is a method of manufacturing the liquid crystal display device according to a third embodiment. The liquid crystal dropping device used in the method of manufacturing the liquid crystal display device of this embodiment has a program including a calculation formula expressed by, Dropping amount of liquid crystals=((height of pillar spacers)−$A$×(number of times of executing the step of forming the alignment film again)−$D$×(number of times of executing the step of heat treatment)+$B$)×$C$    (2)

where A, B, C and D are constants.

The constants A, B and C are the same as those of the formula (1) and are not described here again. The constant D of the third term of the right side in the formula (2) is an amount of decrease in the height of the pillar spacers 32 per each execution of the step of heat treatment for heating the substrate at a high temperature (e.g., not lower than 160° C.). The value of the constant D is, for example, 0.01 µm. If summarized, Dropping amount of liquid crystals=((height of pillar spacers)−0.03×(number of times of executing the step of forming the alignment film again)−0.01×(number of times of executing the step of heat treatment)+0.2)×100    (2')

According to the formulas (2) and (2'), the dropping amount (mg) of liquid crystals can be calculated based on the height (µm) of the pillar spacers 32, the number of times the step is executed for forming the alignment film again and the number of times the step is executed for effecting the heat treatment.

The liquid crystal dropping device obtains the data related to the height of the pillar spacers 32 and the number of times of executing the step of heat treatment and the step of forming the alignment film again as substrate hand-over data from the device used in the preceding step. For example, when there are input the data related to that the height of the pillar spacers 32 is 3.8 µm, the step is executed twice forming the alignment film again and the step is executed once for effecting the heat treatment, the liquid crystal dropping device determines the dropping amount of the liquid crystals based on the formula (2') and drops 393 mg of liquid crystals 22 from the dispenser 2 onto the CF substrate 42. The cell thickness that is finally obtained becomes 3.94 µm.

The steps of manufacturing the liquid crystal display device according to the embodiment other than those described above are nearly the same as the steps of manufacturing the liquid crystal display device of the first embodiment illustrated in FIGS. 5 to 9, and are not diagramed and described here again.

This embodiment not only exhibits the effects same as those of the first and the second embodiments but also determines the dropping amount of the liquid crystals by taking into consideration the number of times the step is executed for effecting the heat treatment, making it possible to determine a suitable dropping amount of the liquid crystals even when the step of heat treatment is executed a number of times that varies depending upon the substrates.

The invention can be modified in a variety of ways not being limited to the above embodiments only.

In the above embodiments, for example, the liquid crystals 22 are dropped on the CF substrate 42. The invention, however, is in no way limited thereto only and the liquid crystals 22 may be dropped onto the TFT substrate 40.

In the above embodiments, further, the pillar spacers 32 are formed on the CF substrate 42. Not being limited thereto only, however, the pillar spacers 32 according to the present invention may be formed on the TFT substrate 40.

According to the present invention as described above, a suitable dropping amount of liquid crystals can be easily determined.

What is claimed is:

1. A method of manufacturing a liquid crystal display device, comprising:
   forming pillar spacers for maintaining a cell thickness on a first substrate;
   measuring the height of the pillar spacers;
   determining the dropping amount of the liquid crystals based on the number of times of executing a step of a predetermined treatment for the first substrate after the height of the pillar spacers has been measured;
   dropping the liquid crystals in the determined dropping amount onto the first substrate or onto a second substrate; and
   sticking the first and second substrates together in vacuum, and returning the pressure back to the atmospheric pressure to inject the liquid crystals into between the first substrate and the second substrate.

2. A method of manufacturing a liquid crystal display device according to claim 1, wherein the step of the predetermined treatment includes a step of peeling off an alignment film that aligns the liquid crystals in a predetermined direction and of forming the alignment film again.

3. A method of manufacturing a liquid crystal display device according to claim 1, wherein the step of the predetermined treatment includes a step of a heat treatment for heating the first substrate.

4. A method of manufacturing a liquid crystal display device according to claim 3, wherein the step of the heat treatment heats the first substrate at not lower than 160° C.

5. A method of manufacturing a liquid crystal display device according to claim 2, wherein the dropping amount is determined by the height of the pillar spacers, by the number of times the step is executed for forming the alignment film, and by constants A, B and C in compliance with the formula, $$\text{Dropping amount of liquid crystals} = ((\text{height of pillar spacers}) - A \times (\text{number of times of executing the step of forming the alignment film again}) + B) \times C \quad (1).$$

6. A method of manufacturing a liquid crystal display device according to claim 3, wherein the dropping amount is determined by the height of the pillar spacers, by the number of times the step is executed for forming the alignment film, by the number of times the step is executed for the heat treatment, and by constants A, B, C and D in compliance with the formula, $$\text{Dropping amount of liquid crystals} = ((\text{height of pillar spacers}) - A \times (\text{number of times of executing the step of forming the alignment film again}) - D \times (\text{number of times of executing the step of heat treatment}) + B) \times C \quad (2).$$

7. A method of manufacturing a liquid crystal display device according to claim 6, wherein the constant D is an amount of decrease in the height of the pillar spacers per each execution of the step of the heat treatment.

8. A method of manufacturing a liquid crystal display device according to claim 5, wherein the constant A is an amount of decrease in the height of the pillar spacers per each execution of the step of forming the alignment film again.

9. A method of manufacturing a liquid crystal display device according to claim 5, wherein the constant B is a correction coefficient determined by the capacity of the region filled with the liquid crystals outside the display portion, by the surface shape of the substrate, by the dispersion in the height of the pillar spacers and by the mechanical properties thereof.

10. A method of manufacturing a liquid crystal display device according to claim 5, wherein the constant C is a product of the area of the region onto where the liquid crystals are injected on the first substrate and the density of the liquid crystals.

11. A method of manufacturing a liquid crystal display device according to claim 5, wherein the dropping amount is determined by using a correspondence table formed based on the formula 1 or the formula 2 so that the height of the pillar spacers and the dropping amount are corresponded to each other.

* * * * *